(12) United States Patent
Solh et al.

(10) Patent No.: US 9,396,394 B1
(45) Date of Patent: Jul. 19, 2016

(54) IRIS IMAGE DATA PROCESSING FOR TEMPLATE IRIS PATTERN GENERATION

(71) Applicant: Amazon Technologies, Inc., Seattle, WA (US)

(72) Inventors: Mashhour Solh, San Jose, CA (US); Serkan Hatipoglu, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 14/496,899

(22) Filed: Sep. 25, 2014

(51) Int. Cl.
*G06K 9/00* (2006.01)
*H04N 5/33* (2006.01)

(52) U.S. Cl.
CPC ............ *G06K 9/00617* (2013.01); *H04N 5/332* (2013.01); *G06T 2207/30041* (2013.01)

(58) Field of Classification Search
None
See application file for complete search history.

(56) References Cited

U.S. PATENT DOCUMENTS

| | | | | |
|---|---|---|---|---|
| 5,325,449 A * | 6/1994 | Burt | ......................... | G06T 5/50 348/E7.086 |
| 6,597,807 B1 * | 7/2003 | Watkins | ............. | G02B 27/2228 348/33 |
| 7,206,455 B1 * | 4/2007 | Hatipoglu | ............... | G06T 5/002 382/240 |
| 8,503,778 B2 * | 8/2013 | Sim | ......................... | G06T 5/008 382/172 |
| 8,919,960 B2 * | 12/2014 | Lewis | ................... | G06T 7/0012 351/200 |
| 2003/0067538 A1 * | 4/2003 | Myers | ................ | G01B 11/2509 348/47 |
| 2009/0002475 A1 * | 1/2009 | Jelley | ................... | H04N 5/2256 348/14.01 |
| 2013/0300875 A1 * | 11/2013 | Strandemar | ............ | H04N 5/217 348/164 |
| 2013/0342691 A1 * | 12/2013 | Lewis | .................... | H04N 5/332 348/143 |
| 2014/0022380 A1 * | 1/2014 | Nissen | ...................... | H04N 5/33 348/125 |
| 2014/0104415 A1 * | 4/2014 | Fox | ........................ | H04N 5/332 348/135 |
| 2014/0240512 A1 * | 8/2014 | Hogasten | ............. | H04N 5/2257 348/164 |
| 2014/0253735 A1 * | 9/2014 | Fox | ..................... | H04M 1/0254 348/164 |
| 2014/0321739 A1 * | 10/2014 | Yang | ....................... | G06T 5/002 382/162 |
| 2015/0085133 A1 * | 3/2015 | Teich | ..................... | H04N 5/332 348/159 |
| 2015/0189192 A1 * | 7/2015 | Jonsson | .................... | G06T 5/50 348/164 |
| 2015/0288892 A1 * | 10/2015 | Frank | ........................ | H04N 5/33 348/164 |
| 2015/0296146 A1 * | 10/2015 | Scanlon | ................. | H04N 5/247 348/82 |
| 2015/0334315 A1 * | 11/2015 | Teich | ................... | H04N 5/2257 348/164 |
| 2015/0358557 A1 * | 12/2015 | Terre | ........................ | H04N 5/33 348/164 |
| 2015/0358560 A1 * | 12/2015 | Boulanger | ............. | H04N 5/332 348/164 |
| 2015/0379361 A1 * | 12/2015 | Boulanger | ........... | H04N 5/2257 701/2 |

OTHER PUBLICATIONS

Adelson, E.H., et al. "Pyramid methods in image processing." RCA Corporation: RCE Engineer, Nov./Dec. 1984 (9 pgs.).
Leonidou, Mitiades. "Iris Recognition: Close than we think?" GIAC Security Essentials Certification (GSEC); GSEC Certification Paper—Research on Tops of Information Security. 2002. (19 pgs.).

(Continued)

*Primary Examiner* — Aaron W Carter
(74) *Attorney, Agent, or Firm* — Sutherland Asbill & Brennan LLP

(57) ABSTRACT

Systems, devices, methods, computer-readable media, techniques, and methodologies are disclosed for generating a template iris pattern using multiple image frames containing image data corresponding to detected light at different wavelengths along the electromagnetic (EM) spectrum including light in the infrared, near-infrared, and/or visible light bands.

20 Claims, 9 Drawing Sheets

(56) References Cited

OTHER PUBLICATIONS

Kuan, Xu, et al. "Iris Recognition Using Spatial Pyramid." Proceedings of the 2nd International Conference on Computer Science and Electronics Engineering (ICCSEE 2013) (4 pgs.).

Ma, Li, et al. "Local Intensity Variation Analysis for Iris Recognition." National Laboratory of Pattern Recognition, Institute of Automation, Chinese Academy of Sciences; Beijing, China. (30 pgs.), 2004.

Biometric Iris Recognition System—Power Point Presentation downloaded Jan. 13, 2015 at: https://www.google.com/url?sa=t&rct=j&q=&esrc=s&source=web&cd=2&cad=rja&uact=8&ved=0CCsQFjAB&url=http%3A%2F%2Fwww.geos.ed.ac.uk%2F~rharwood%2Fteaching%2Ftemp%2FRecognition_Rodrigues.ppt&ei=n3qijU6PBPMTJoASL_oD4BA&usg=AFQjCNG-9i1jutDRhAFzY8vOYiJnG5F4NA&sig2=Y_EfPf1pt4h_eQxFr-Ut_A&bvm=bv.69411363,d.cGU.

Zhou, J., et al. "A wavelet transform method to merge Landsat TM and SPOT panchromatic data." The Laboratory for Earth Resources Information Systems, Department of Natural Resources Management & Engineering, and Department of Ecology & Evolutionary Biology, The University of Connecticut; Storrs, CT, US. Apr. 29, 1997. (15 pgs.).

Burt, Peter J., et al. "Merging Images Through Pattern Decomposition." SPIE vol. 575 Applications of Digital Image Processing VII; Princeton, NJ, US. 1985. (9 pgs.).

* cited by examiner

IRIS IMAGE DATA PROCESSING FOR TEMPLATE IRIS PATTERN GENERATION

BACKGROUND

Biometrics refers to metrics that are related to human characteristics or traits and which can be used to identify or authenticate individuals. A biometric identifier may include any distinctive and measurable characteristic that may be used to label and describe individuals. Biometric identifiers may be broadly categorized into two categories: identifiers that reflect physiological characteristics and identifiers that reflect behavioral characteristics. Physiological biometric identifiers may include fingerprints, palm vein patterns, facial features, DNA sequences, palm prints, hand geometries, iris patterns, retinal blood vessel patterns, or the like. Behavioral biometric identifiers may include typing rhythms, handwriting styles, gait, vocal characteristics, or the like. A number of performance metrics may be used to evaluate a biometric identifier and associated biometric system's capability to uniquely identify an individual. Such performance metrics may include, for example, a false acceptance rate, a false rejection rate, a failure to enroll rate, a failure to capture rate, a template capacity, and so forth.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
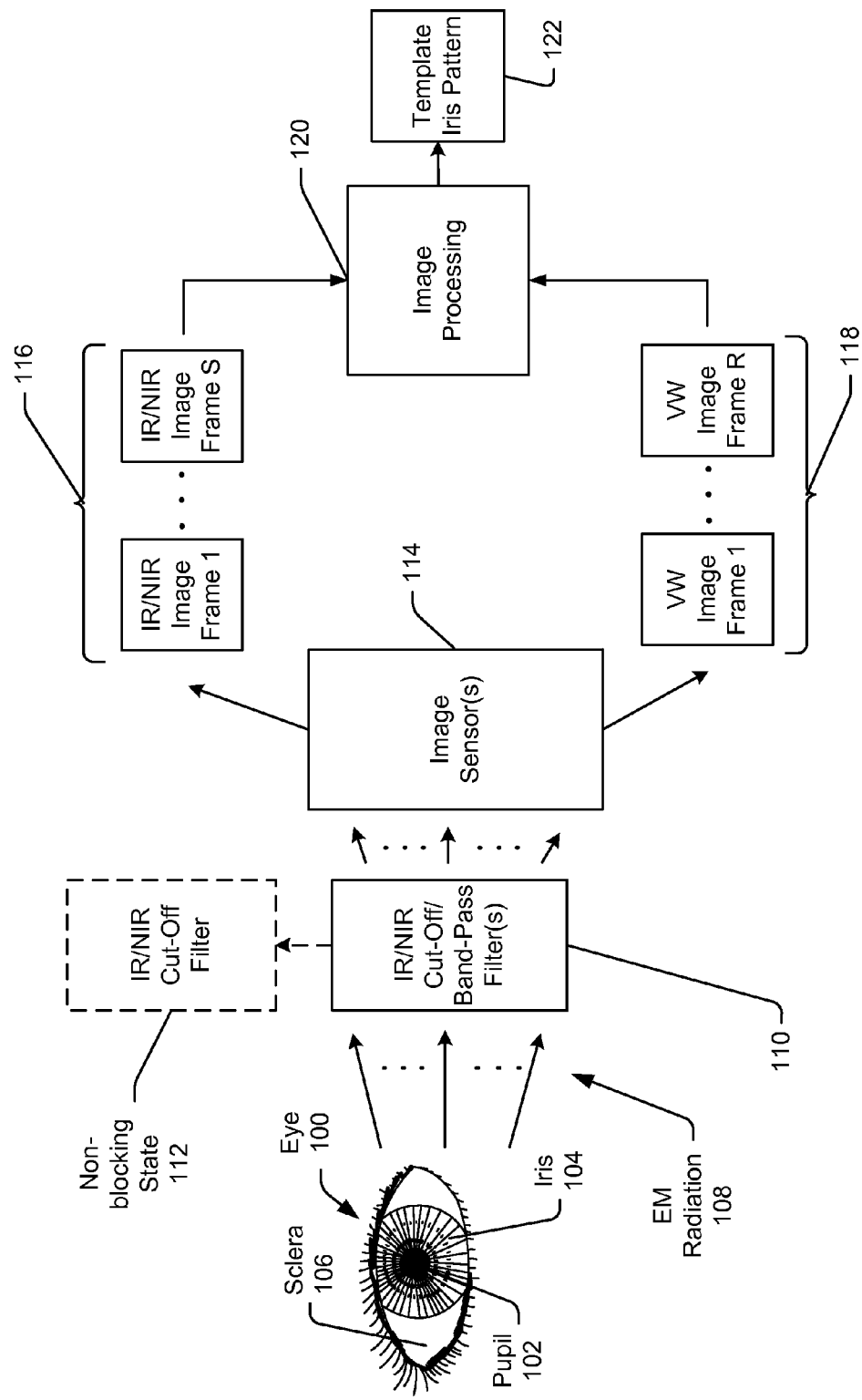
FIG. 1 is a schematic system and data flow diagram illustrating the generation of a template iris pattern by performing image processing on image frames containing image data corresponding to detected light of different wavelengths in accordance with one or more example embodiments of the disclosure.

This disclosure relates to, among other things, systems, devices, methods, computer-readable media, techniques, and methodologies for generating a template iris pattern using multiple image frames containing image data corresponding to detected light at different wavelengths along the electromagnetic (EM) spectrum. Such wavelengths may include, for example, the infrared (IR) wavelength band of the EM spectrum, the near infrared (NIR) wavelength band, the visible wavelength (VW) band, or the like.

The iris is a thin, circular structure in the eye that is responsible for controlling the diameter and size of the pupil, and thus, the amount of light reaching the retina—a light-sensitive layer of tissue lining the inner surface of the eye and on which optics of the eye project an image of the visual world. The iris is typically strongly pigmented and may exhibit a range of colors. Melanin is a broad term that refers to a group of natural pigments found in most organisms. Two types of melanin—eumelanin and pheomelanin—may be responsible for the pigmentation of the iris. More particularly, iris color may be due, at least in part, to the presence of varying amounts of eumelanin (which produces a black or brown hue) and pheomelanin (which produces pink/red/yellow hues). Darker irises typically have larger concentrations of eumelanin and lighter irises typically have larger concentrations of pheomelanin. Although melanin is the primary determinant of iris color, a number of other factors may impact iris color as well including texture, fibrous tissue, and blood vessels within the iris stroma.

The absorbance of melanin in the IR or NIR bands is typically negligible. However, at shorter wavelengths within the VW band, melanin may become excited and may reveal rich pigmentation details. In the VW band, the albredo (ratio of reflected radiation to incident radiation) is typically low for darker irises, and the iris image may become dominated by corneal specular reflections that may mask pigmentation details of darker irises. In the IR or NIR bands, however, rich textural details may be revealed for darker irises, and corneal specular reflections may be simultaneously blocked.

In accordance with example embodiments of the disclosure, one or more image sensors may be provided for capturing images of an iris. One or more IR or NIR cut-off or band-pass filters may be provided for reflecting (or absorbing) light within the IR or NIR bands or allowing light within the IR or NIR bands to pass through to the image sensor(s). In addition, sensor pixels of the image sensor(s) may have varying responses to different frequency bands. Through the use of different types of image sensor(s) and cut-off or band-pass IR or NIR filter(s), multiple image frames containing image data corresponding to different wavelength bands (e.g., IR, NIR, VW bands) may be captured. The image data contained in the multiple image frames may be combined according to image processing techniques described herein to generate an iris template pattern having an increased amount of pattern data, and thus, reduced false acceptance and false rejection rates. Hereinafter, the shortened form "IR/NIR" may be used to refer to light in the IR and/or NIR bands or any component, data, or the like associated with light in the IR and/or NIR bands. Further, the term VW may be used to refer to light in the VW band (or any wavelength that is neither in the IR band nor in the NIR band) or any associated component, data, or the like.

In an example embodiment of the disclosure, an image frame may be processed to generate a Laplacian pyramid for the image frame. In a first iteration of an algorithmic process for generating a Laplacian pyramid, image data of an image frame may be low-pass filtered using, for example, a Gaussian filter or the like to generate first filtered image data. The image data of an image frame may include, for example, an intensity of light (e.g., a number of photons) detected at each pixel of an image sensor for each of one or more wavelengths or wavelength bands. A band-pass filter may then be applied to the image data of the image frame to generate second filtered image data. For example, the first filtered image data may be subtracted from the image data to generate the second filtered image data. The second filtered image data obtained in this manner may correspond to a first level of the Laplacian pyramid. The first filtered image data may then be down-sampled to reduce the number of pixels by, for example, an integer factor of 2. The down-sampled image data may then serve as source image data for a subsequent iteration of the process for generating the Laplacian pyramid. This subsequent iteration may generate additional second filtered image data corresponding to a second level of the Laplacian pyramid. The process may continue for a predetermined number of iterations until N levels of the Laplacian pyramid are generated, with each level corresponding to band-pass filtered image data for a number of pixels reduced by a down-sampling factor from the number of pixels for which band-pass filtered image data was generated during a previous iteration of the process.

Laplacian pyramids may be generated for any number of IR/NIR and/or VW image frames. An IR/NIR image frame, as that term is used herein, may include image data corresponding to detected light in the IR and/or NIR bands. Further, a VW image frame may include image data corresponding to detected light that is neither in the IR band nor in the NIR band (e.g., light in the VW band). The image data represented by a Laplacian pyramid may be stored in any suitable data structure such as, for example, an ordered data structure including, but not limited to, an array, a linked list, an ordered list, an ordered set, a tree, a heap, and so forth. The filtered image data represented by any number of Laplacian pyramids corresponding to any number of IR/NIR or VW image frames may be combined to generate composite image data. The composite image data may be represented by a composite image frame Laplacian pyramid. For example, the pixel intensities for image data corresponding to a same pyramid level may be evaluated across multiple Laplacian pyramids. For each image pixel at a given pyramid level, the Laplacian pyramid having the largest light intensity at any wavelength may be identified, and that light intensity value (which may correspond to the IR, NIR, or VW bands, for example) may be included as composite image data in a corresponding level of the composite image frame Laplacian pyramid. This process may be repeated for each pixel at each pyramid level. In this manner, the composite image frame data represented by the composite image frame Laplacian pyramid may exhibit improved contrast and sharper iris patterns than any individual image frame.

After generating the composite image frame Laplacian pyramid, an interpolation technique may be employed to generate final output image data from which an iris template pattern may be generated. The interpolation technique may begin by up-sampling the composite image data at the highest level of the Laplacian pyramid (e.g., the composite image data corresponding to the smallest number of pixels). The up-sampled composite image data may then be summed with composite image data from the second highest level of the pyramid (e.g., the composite image data corresponding to the next smallest number of pixels). The summed image may then serve as a source image for a subsequent iteration of the interpolation technique. In particular, the summed image may be up-sampled and summed with composite image data from the subsequent level of the pyramid to generate another summed image, which may similarly serve as a source image for a next iteration of the technique. The process may be repeated until a final summed image is generated that is approximately equal in size to original image frames from which the composite image data was generated. This final summed image may then be summed with initial low-pass filtered data to obtain the final output image data. The initial low-pass filtered data may include any data obtained from low-pass filtering any of the initial image data from which the constituent Laplacian pyramids used to generate the composite image frame Laplacian pyramid are generated.

Once final output image data is generated using the interpolation technique described above, processing may be performed to identify a template iris pattern within the final output image data. More specifically, a pupil region within the final output image data may be determined by comparing a first light intensity gradient between light intensity values in the final output image data for a first set of pixels and light intensity values in the final output image data for a second set of neighboring pixels to a first threshold value. In this manner, a boundary of the pupil region may be determined based on whether the first light intensity gradient exceeds the first threshold value. An iris region of the final output image data may then be determined by comparing a second light intensity gradient between a light intensity values for a third set of pixels and light intensity values for a fourth set of neighboring pixels to a second threshold value. In this manner, an outer boundary of the iris region may be determined based on whether the second light intensity gradient exceeds the second threshold value. The iris region may be defined by an inner boundary corresponding to the boundary of the pupil region and an outer boundary corresponding to where the iris interfaces with the sclera. For darker irises, the first threshold value used to determine the boundary of the pupil region (the inner boundary of the iris region) may be less than the second threshold value used to determine the outer boundary of the iris region. Conversely, for lighter irises, the first threshold value may be greater than the second threshold value. Once the iris region is identified, feature extraction processing may be performed on the iris region to generate a template iris pattern for subsequent biometric recognition using iris pattern matching.

Example embodiments of the disclosure provide a number of technical features or technical effects. For example, systems, methods, and computer-readable media in accordance with example embodiments of the disclosure provide iris pattern data with improved contrast and sharpness by combining image data corresponding to detected light at different wavelengths including, for example, light in the IR, NIR, or VW bands. As such, example embodiments of the disclosure provide iris pattern data having an increased assortment of features that may be used for identification/authentication purposes (e.g., rings, furrows, freckles, etc.) for lighter and darker irises alike. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. For example, while example embodiments may be described in connection with obtaining iris template patterns having increased clarity, sharpness, and/or detail, embodiments of the disclosure are applicable to other contexts as well including, but limited to, obtaining images having increased clarity, sharpness, and/or detail as part of a remote deposit capture process, for example. The above-described embodiments and additional and/or alternative embodiments of the disclosure will be described in detail hereinafter through reference to the accompanying drawings.

Illustrative Processes

FIG. 1 is a schematic system and data flow diagram illustrating the generation of a template iris pattern by performing image processing on image frames containing image data corresponding to detected light of different wavelengths in accordance with one or more example embodiments of the disclosure.

An example anatomical structure of an eye 100 is depicted in FIG. 1. The eye 100 may include a pupil 102 surrounded by an iris 104. The eye 100 may further include a sclera 106. The iris 104 may have a ring-like shape defined by an inner boundary that corresponds to an outer boundary of the pupil 102 and an outer boundary defined by an interface between the iris 104 and the sclera 106.

Electromagnetic (EM) radiation 108 may be reflected off of the various anatomical components of the eye 100. The EM radiation 108 may include light in the IR, NIR, and/or VW bands, for example. One or more image sensors 114 may be provided for detecting the EM radiation 108 and generating corresponding image frames. The image sensor(s) 114 may include any device configured to convert an optical image into an electrical signal including, without limitation, a charge-coupled device (CCD) image sensor, a complementary metal-oxide-semiconductor (CMOS) image sensor, an N-type metal-oxide-semiconductor (NMOS) image sensor, or the like. The image sensor(s) 114 may include multiple image sensors having varying responses to different frequency bands. In addition, one or more IR/NIR cut-off or band-pass filters 110 may be provided for restricting IR/NIR band light from reaching or allowing IR/NIR band light to reach the image sensor(s) 114. In certain example embodiments, an IR/NIR cut-off filter may be transitioned to a non-blocking state 112 in which IR/NIR band light is permitted to reach an image sensor 114. Additionally, or alternatively, an IR/NIR band-pass filter 110 may be provided that permits light in the IR/NIR bands to reach an image sensor 114. It should be appreciated that IR/NIR cut-off or band-pass filters may be used in any suitable combination to restrict IR/NIR light from reaching an image sensor 114 or to permit IR/NIR light to pass through to an image sensor 114.

Through selective use of IR/NIR cut-off or band-pass filter(s) 110, the image sensor(s) 114 may generate one or more IR/NIR image frames 116 and one or more VW image frames 118. Image processing techniques 120 described herein may be applied to the IR/NIR image frame(s) 116 and the VW image frame(s) 118 to generate final output image data from which a template iris pattern 122 may be identified.

Figure 2:
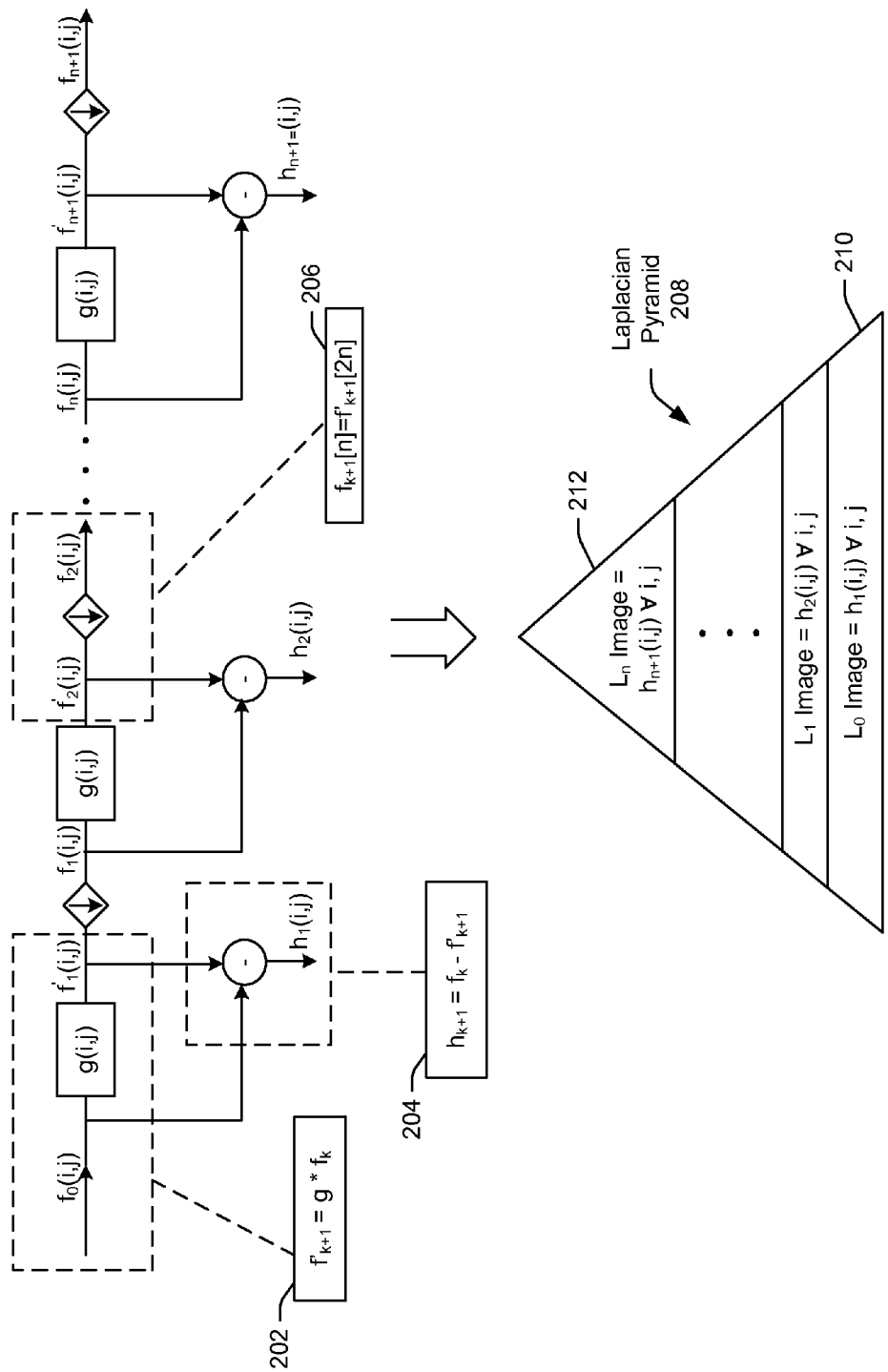
FIG. 2 is a schematic diagram of an illustrative algorithmic process for generating a Laplacian pyramid from image data of an image frame in accordance with one or more example embodiments of the disclosure.
Figure 5:
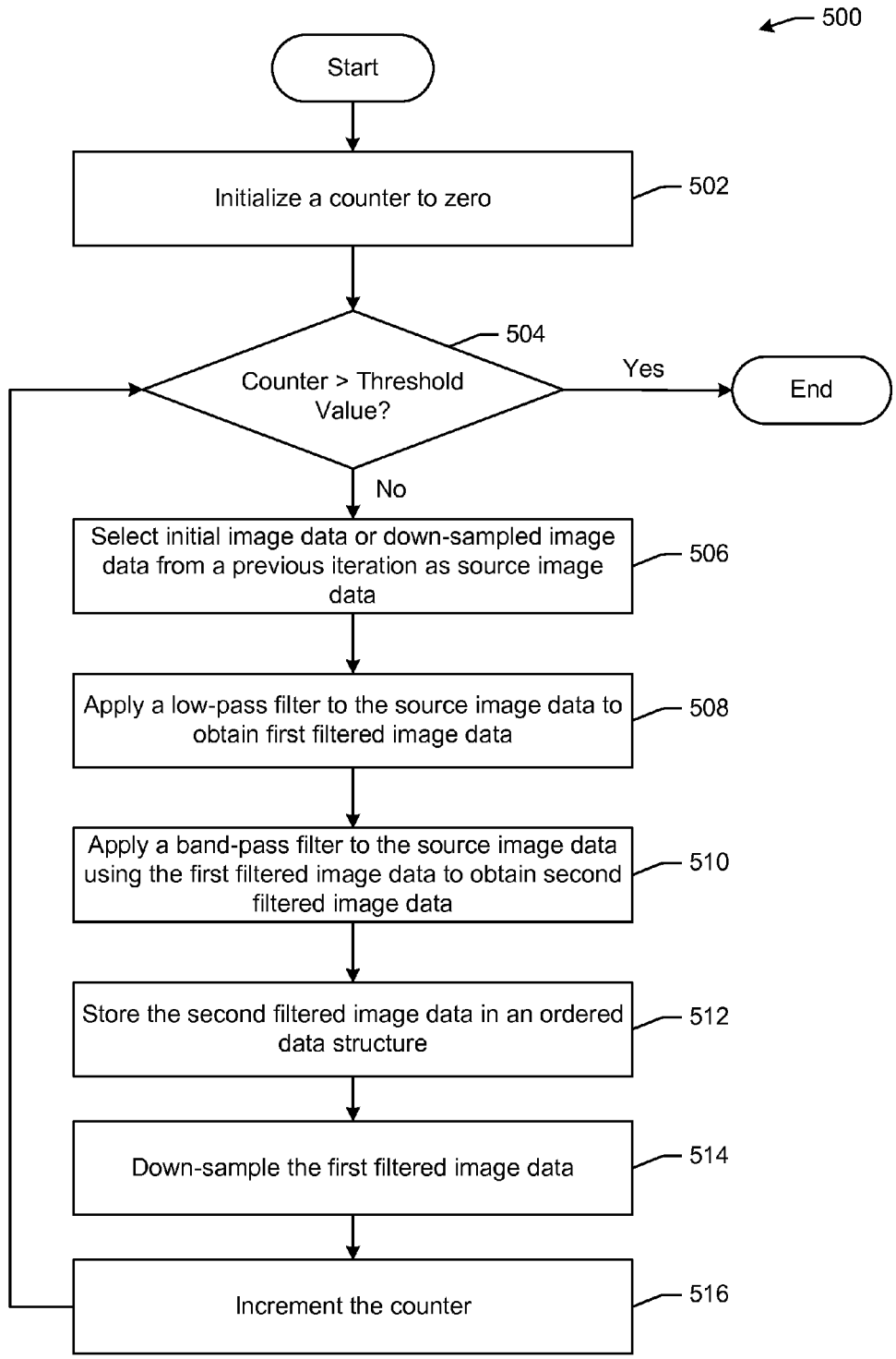
FIG. 5 is a process flow diagram of an illustrative method for generating a Laplacian pyramid from image data of an image frame in accordance with one or more example embodiments of the disclosure.

FIG. 2 is a schematic diagram of an illustrative algorithmic process for generating a Laplacian pyramid from image data of an image frame in accordance with one or more example embodiments of the disclosure. FIG. 2 will be described hereinafter in conjunction with FIG. 5, which depicts a process flow diagram of an illustrative method 500 for generating a Laplacian pyramid from image data of an image frame in accordance with one or more example embodiments of the disclosure.

At block 502, a counter may be initialized. In certain example embodiments, the value to which the counter is initialized may be zero. In such example embodiments, the counter may be incremented at each iteration of the method 500, and the method 500 may cease when the counter exceeds a threshold value, such as a predetermined number of iterations of the method 500, which may, in turn, correspond to a desired number of levels of the Laplacian pyramid to be generated. In certain example embodiments, the desired number of levels may be determined as a function of the portion of the image frame occupied by the iris region. For example, for larger iris regions, a Laplacian pyramid having a greater number of levels may be generated. In addition, image sharpness may be factor in determining the desired number of Laplacian pyramid levels. For example, a greater number of Laplacian pyramid levels may be generated for images having greater sharpness.

Further, it should be appreciated that the counter may be initialized to a different value in various other example embodiments. For example, the counter may be initialized to the predetermined number of iterations of the method 500 (e.g., a desired number of levels of the Laplacian pyramid to be generated), the counter may be decremented at each iteration, and the method 500 may cease when the counter equals zero. It should be appreciated that the above examples for counter initialization are merely illustrative and not exhaustive and that the counter may be initialized to any suitable value.

At block 504, a determination may be made as to whether the counter exceeds a threshold above. As previously noted, in those example embodiments in which the counter is initialized to zero, the threshold value may correspond to a predetermined number of iterations of the method 500, which may, in turn, correspond to a desired number of levels of the Laplacian pyramid to be generated.

In response to a negative determination, the method 500 may proceed to block 506. At block 506, in a first iteration of the method 500, initial image data may be selected as source image data. The initial image data may correspond to image data contained in an IR/NIR image frame captured by an image sensor or image data contained in a VW image frame.

At block 508, computer-executable instructions, code, or the like of low-pass filtering module(s) 920 (which will be described in more detail later in this disclosure in reference to FIG. 9) may be executed by one or more processors to cause a low-pass filter to be applied to the source image data to obtain first filtered image data. In certain example embodiments, the low-pass filter may be a Gaussian filter. A Gaussian filter may be a filter whose impulse response is a Gaussian function. Accordingly, in such example embodiments, application of the low-pass filter to the source image data may include convolution of the source image data with a Gaussian function (e.g., a Weierstrass transform) as reflected by equation 202 in FIG. 2. Convolution of the source image data with a Gaussian function may produce a blurred image and may be referred to as Gaussian blurring or Gaussian smoothing. Gaussian blurring has the effect of reducing high-frequency components present in the image data, and thus, application of a Gaussian filter to the source image data corresponds to low-pass filtering of the source image data. It should be appreciated that a Gaussian filter is merely an example type of low-pass filter that may be applied at block 508, and that any suitable low-pass filter may be used.

At block 510, computer-executable instructions, code, or the like of band-pass filtering module(s) 922 may be executed by one or more processors to cause a band-pass filter to be applied to the source image data using the first filtered image data in order to obtain second filtered image data. In certain example embodiments, application of a band-pass filter at block 510 may include generating a difference image by subtracting the first filtered image data from the source image data. The difference image may include the second filtered image data. An equation 204 for generating the difference image is depicted in FIG. 2.

At block 512, the second filtered image data may be stored in an ordered data structure. The ordered data structure may include any of the example types of data structures described earlier, and generally, may include any data structure capable of representing the structure of a Laplacian pyramid such as, Laplacian pyramid 208 depicted in FIG. 2. By way of example, and without limitation, the second filtered image data may be stored at a particular location of an array. The index of the location at which the second filtered image data is stored may correspond to a particular level of the Laplacian pyramid 208. For example, the second filtered image data generated as a result of a first iteration of the method 500 may be stored at a location in the ordered data structure that corresponds to an initial level 210 of the Laplacian pyramid 208.

At block 514, computer-executable instructions, code, or the like of the down-sampling module(s) 926 may be executed to down-sample the first filtered image data. An example equation 206 for down-sampling the first filtered image data is depicted in FIG. 2. As shown, in certain example embodiments, down-sampling the first filtered image data may include reducing a number of pixels in the first filtered image data by approximately ½. The down-sampling performed at block 514 on the first filtered image data and the low-pass filtering performed at block 508 may together constitute a decimation process for reducing the sampling rate of image signals corresponding to the first filtered image data. In certain example embodiments, the down-sampling may include combining signals corresponding to neighboring pixels. While down-sampling by an integer factor of 2 is illustratively shown in FIG. 2, it should be appreciated that the first filtered image data may be down-sampled by any suitable value including any suitable integer or rational fraction.

Following a first iteration of the operations of blocks 506-514, the counter may be incremented at block 516. The method 500 may then proceed again to block 504, where the now incremented counter may be compared against the threshold value. If the counter exceeds the threshold value, the method 500 may end. Alternatively, if the counter does not exceed the threshold value (which indicates that additional levels of the Laplacian pyramid 208 are to be generated), the method 500 may again proceed to block 506. In a second iteration of the method 500, the down-sampled first filtered image data from the initial iteration of the method 500 may be selected as the source image data. Similarly, for each subsequent iteration of the method 500, the down-sampled first filtered image data from the previous iteration may be selected as the source image data at block 506.

In each iteration of the method 500 subsequent to the initial iteration, the down-sampled first filtered image data from a previous iteration may be low-pass filtered at block 508 to obtain first filtered image data, and may be band-passed filtered at block 510 using the first filtered image data to obtain second filtered image data. At block 512, the second filtered image data may be stored in the ordered data structure at a subsequent location in the data structure corresponding to a subsequent level of the Laplacian pyramid 208. The second filtered image data may be down-sampled at block 514 and the down-sampled image data may serve as the source image data for a next iteration (if performed). The counter may again be incremented at block 516, and the operations of blocks 506-516 may be iteratively performed until a negative determination is made at block 504. Upon completion of a final iteration of method 500, the second filtered image data corresponding to a highest level 212 of the Laplacian pyramid 208 may include image data for a smallest number of pixels compared to second filtered image data corresponding to any other level of the Laplacian pyramid 208.

It should be appreciated that the low-pass filter and band-pass filter applied as part of method 500 may be applied to each image signal corresponding to each pixel in image data. As such, the (i,j) coordinate-pairs depicted in FIG. 2 may represent the respective coordinate pair in an X-Y coordinate plane for each pixel having a corresponding light intensity value represented in image data. In certain example embodiments, the filtered image data corresponding to each successive level of the Laplacian pyramid 208 may include a greater number of high frequency components than the filtered image data corresponding to a previous level of the Laplacian pyramid 208.

Figure 3:
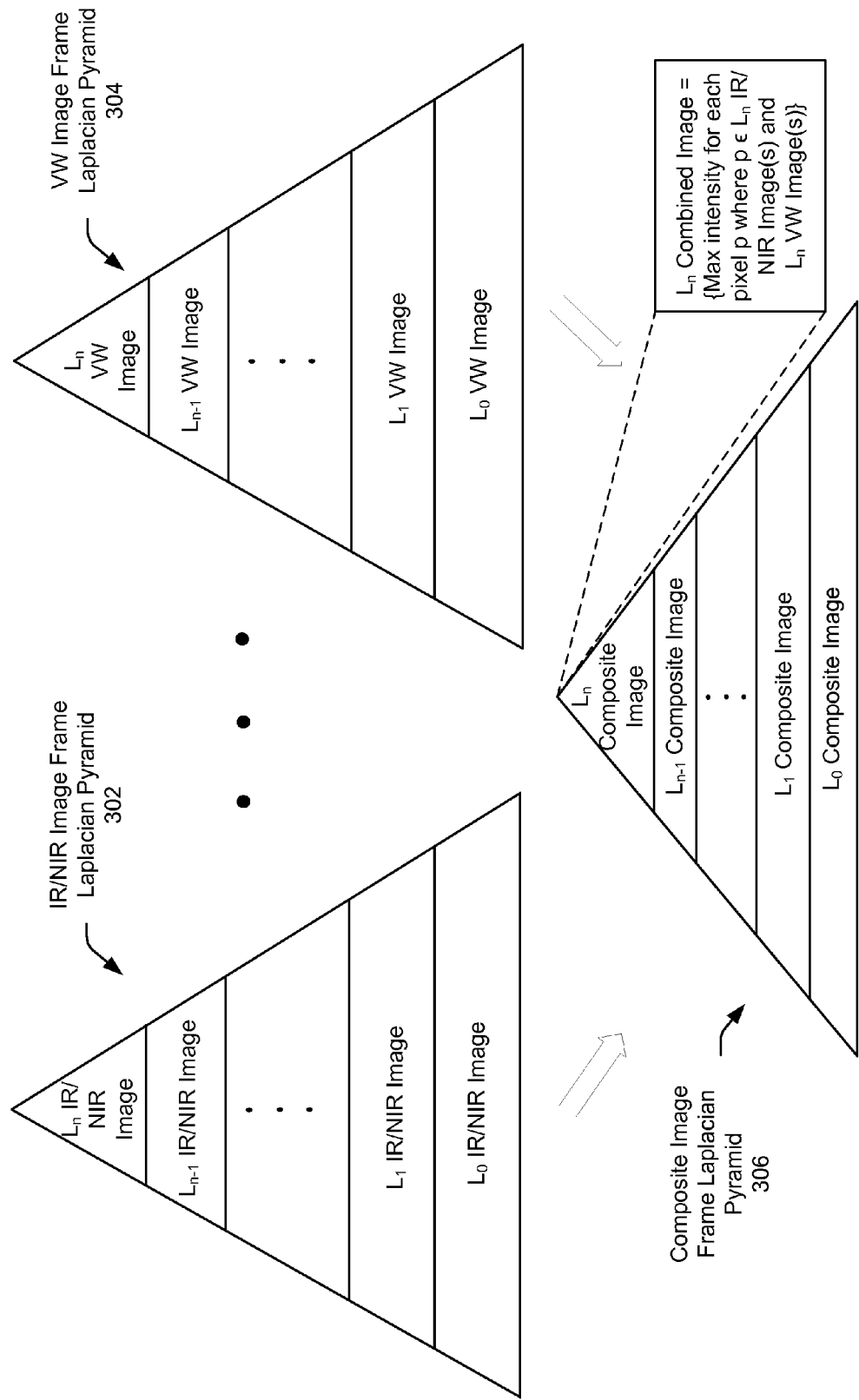
FIG. 3 is a schematic diagram illustrating the generation of a Laplacian pyramid containing composite image data in accordance with one or more example embodiments of the disclosure.
Figure 6:
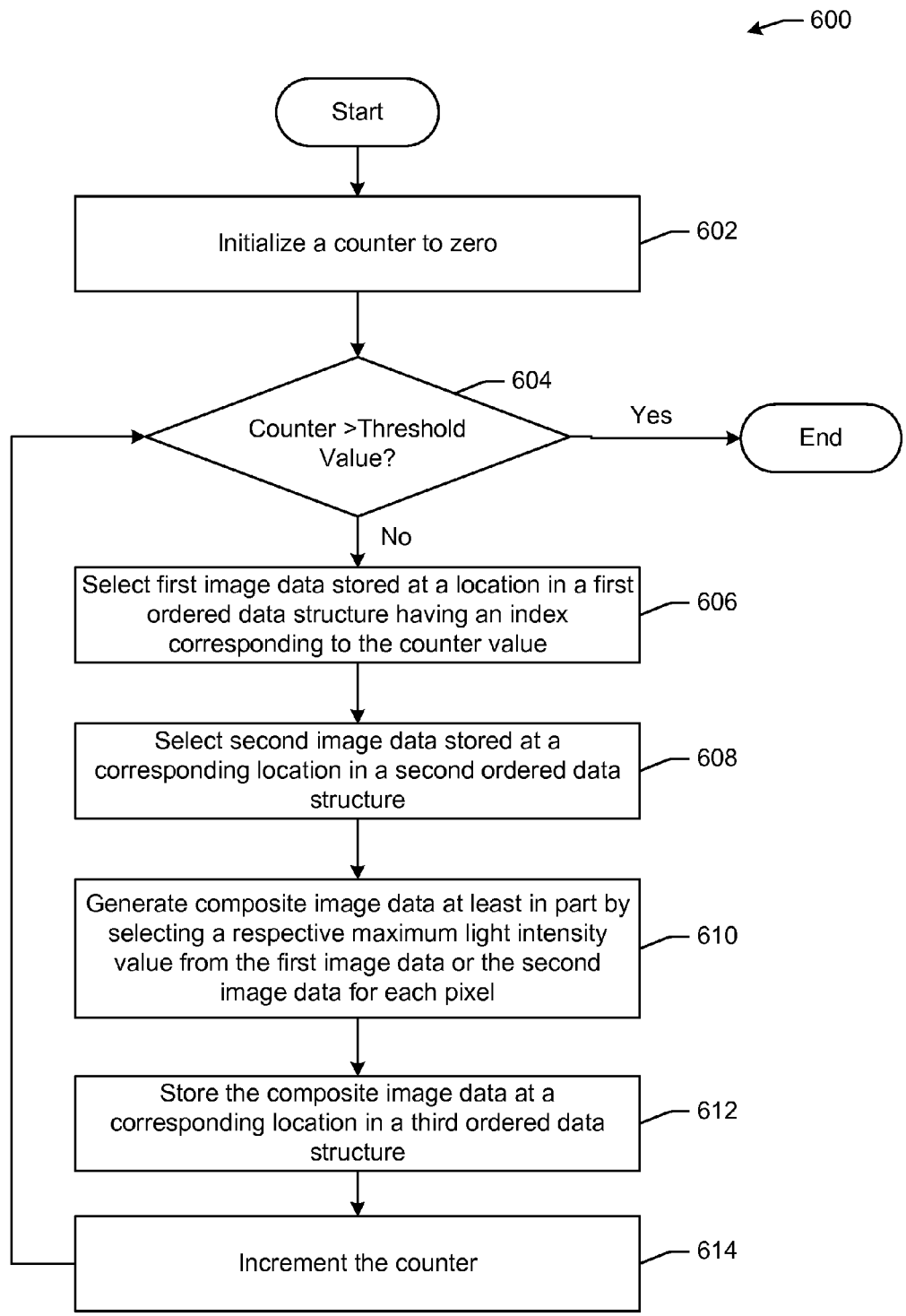
FIG. 6 is a process flow diagram of an illustrative method for generating a Laplacian pyramid containing composite image data in accordance with one or more example embodiments of the disclosure.

FIG. 3 is a schematic diagram illustrating the generation of a Laplacian pyramid containing composite image data in accordance with one or more example embodiments of the disclosure. FIG. 3 will be described hereinafter in conjunction with FIG. 6, which is a process flow diagram of an illustrative method 600 for generating a Laplacian pyramid containing composite image data in accordance with one or more example embodiments of the disclosure. One or more operations of the method 600 may be performed responsive to execution, by one or more processors, of computer-executable instructions, code, or the like contained or otherwise associated with one or more composite image data generation module(s) 928.

At block 602, a counter may be initialized. In certain example embodiments, the value to which the counter is initialized may be zero. In such example embodiments, the counter may be incremented at each iteration of the method 600, and the method 600 may cease when the counter exceeds a threshold value, such as a predetermined number of iterations of the method 600, which may, in turn, correspond to a number of levels of the Laplacian pyramids from which the composite image frame Laplacian pyramid 306 depicted in FIG. 3 is to be generated. It should be appreciated that the counter may be initialized to a different value in various other example embodiments. For example, the counter may be initialized to the predetermined number of iterations of the method 600 (e.g., the number of levels of the Laplacian pyramids from which the composite Laplacian pyramid 306 is to be generated), the counter may be decremented at each iteration, and the method 600 may cease when the counter equals zero. It should be appreciated that the above examples for counter initialization are merely illustrative and not exhaustive and that the counter may be initialized to any value.

At block 604, a determination may be made as to whether the counter exceeds a threshold above. As previously noted, in those example embodiments in which the counter is initialized to zero, the threshold value may correspond to a predetermined number of iterations of the method 600, which may, in turn, correspond to a number of levels of the Laplacian pyramids from which the composite image frame Laplacian pyramid 306 is to be generated.

In response to a negative determination at block 604, the method 600 may proceed to block 606. At block 606, in a first iteration of the method 600, first image data stored in a first ordered data structure at a first location having an index corresponding to the counter value may be selected. The first image data selected at block 606 in a first iteration of the method 600 may include, for example, IR/NIR image data corresponding to an $L_0$ level of the IR/NIR image frame Laplacian pyramid 302. As previously noted, the pyramid 302 or any other Laplacian pyramid described herein may be represented in data storage using any suitable ordered data structure that indicates an order of image data corresponding to different levels of the pyramid 302.

At block 608, second image data may be selected. The second image data may be stored in a second ordered data structure at a location that corresponds to the location at which the first image data is stored in the first ordered data structure. For example, the second ordered data structure may store the image data corresponding to the VW image frame Laplacian pyramid 304. The second image data selected at block 608 as part of a first iteration of the method 600 may include, for example, VW band image data corresponding to an $L_0$ level of the VW image frame Laplacian pyramid 304.

At block 610, composite image data may be generated at least in part by selecting a respective maximum light intensity value from the first image data or the second image data for each pixel having light intensity values represented in the first and second image data. For example, for any given pixel, if the light intensity for that pixel (e.g., the number of photons detected at a corresponding image sensor pixel) is greater in the IR/NIR image data than in the VW image data, the light intensity value from the IR/NIR image data may be selected for inclusion in the composite image data. Conversely, if the light intensity value for a pixel is greater in the VW image data than in the IR/NIR image data, the light intensity value from the VW image data may be selected for inclusion in the composite image data. In this manner, in a first iteration of the method 600, composite image data may be generated for a first level ($L_0$ level) of a composite image frame Laplacian pyramid 306 based on image data at corresponding levels of the IR/NIR image frame Laplacian pyramid 302 and the VW image frame Laplacian pyramid 304.

At block 612, the composite image data generated at block 610 may be stored. The composite image data may be stored in a third ordered data structure corresponding to the composite image frame Laplacian pyramid 306. More specifically, the composite image data generated at block 610 may be stored at a location in the third ordered data structure that corresponds to the locations at which the first image data and the second image data are stored in the first ordered data structure and the second ordered data structure, respectively. In this manner, the composite image data corresponding to a particular level of the composite image frame Laplacian pyramid 306 may be correlated to image data at corresponding levels of the IR/NIR image frame Laplacian pyramid 302 and the VW image frame Laplacian pyramid 304.

At block 614, the counter may be incremented, and the method 600 may proceed again to block 604, where the incremented counter may be compared against the threshold value. The method 600 may proceed iteratively as long as the counter does not exceed the threshold value. At each subsequent iteration of the method 600, image data having a maximum pixel intensity may be selected, on a per-pixel basis, from the IR/NIR image data or from the VW image data that respectively corresponds to subsequent levels of the IR/NIR image frame Laplacian pyramid 302 and the VW image frame Laplacian pyramid 304. The selected image data may be stored as composite image data for a corresponding level of the pyramid 306. For example, in a second iteration of the method 600, the maximum pixel intensities may be selected from the $L_1$ IR/NIR image data or the $L_1$ VW image data to generate the $L_1$ composite image data. The method 600 may proceed iteratively until it is determined at block 604 that the counter exceeds the threshold value, at which point, composite image data has been generated for each level of the pyramid 306.

Figure 4:
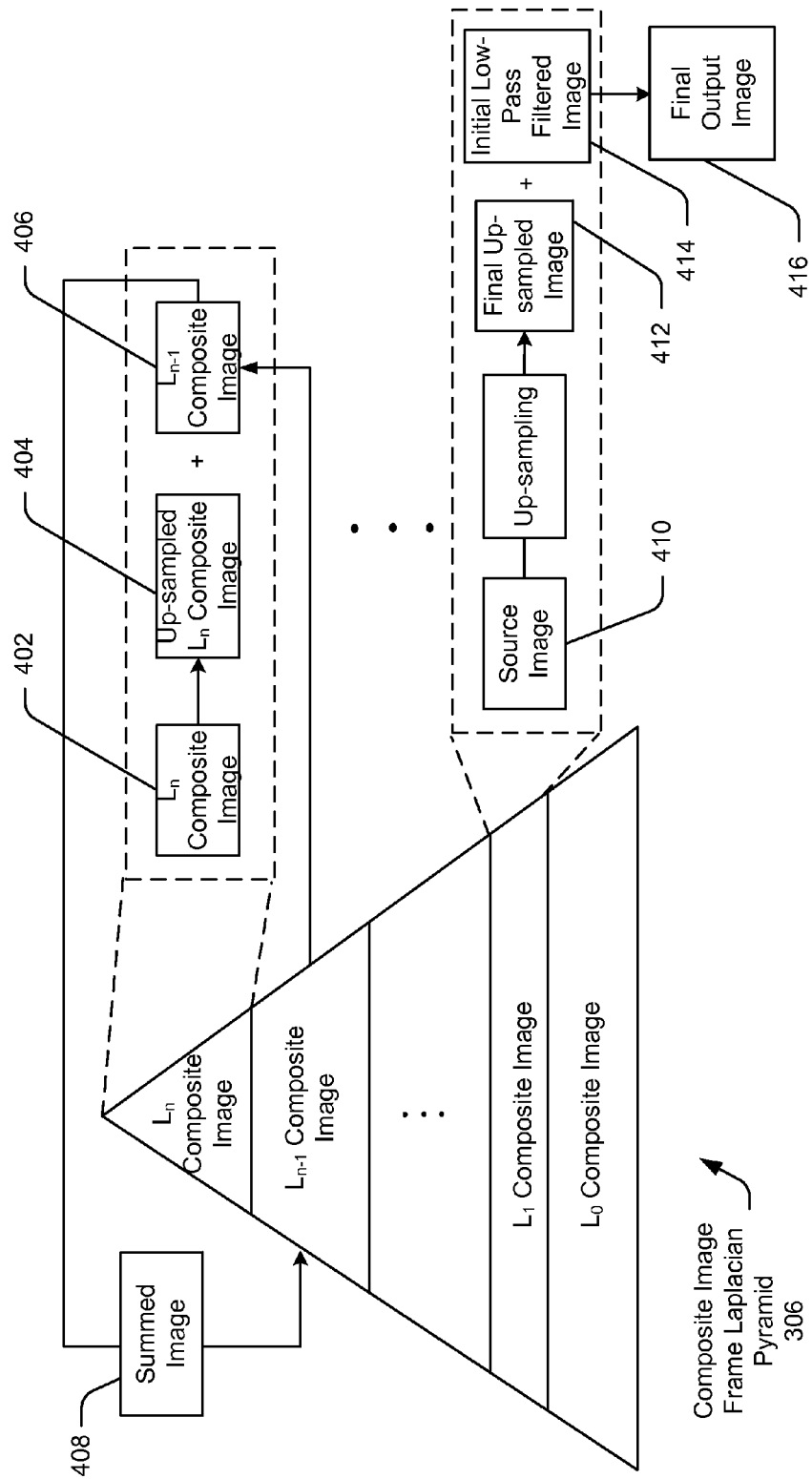
FIG. 4 is a schematic diagram illustrating the up-sampling of composite image data contained in a Laplacian pyramid to generate final output image data in accordance with one or more example embodiments of the disclosure.

FIG. 4 is a schematic diagram illustrating the up-sampling of composite image data contained in a Laplacian pyramid to generate final output image data in accordance with one or more example embodiments of the disclosure. FIG. 4 will be described hereinafter in conjunction with FIG. 7, which is a process flow diagram of an illustrative method 700 for up-sampling composite image data contained in a Laplacian pyramid to generate final output image data in accordance with one or more example embodiments of the disclosure. One or more operations of the method 700 may be performed responsive to execution, by one or more processors, of computer-executable instructions, code, or the like contained in or otherwise associated with one or more up-sampling module(s) 924.

At block 702, a counter may be initialized. In certain example embodiments, the counter may be initialized to a largest index of an ordered data structure storing composite image data. The ordered data structure may store composite image data corresponding to the composite image frame Laplacian pyramid 306 generated in accordance with the example method 600 of FIG. 6, for example. The counter may be decremented at each iteration of the method 700, and the method 700 may cease when the counter equals zero, which may correspond to a scenario in which an up-scaling operation has been performed with respect to all levels of the pyramid 306. It should be appreciated that the counter may be initialized to a different value in various other example embodiments. For example, the counter may be initialized to zero and may be incremented at each iteration of the method 700. The method 700 may then cease when the counter exceeds a threshold value corresponding to the number of levels in the pyramid 306. In such embodiments, the appropriate composite image data may be accessed at each iteration of the method 700 based on pre-existing knowledge of the correspondence between the order in which the composite image data is stored in the ordered data structure and the levels of the pyramid 306. It should be appreciated that the above examples for counter initialization are merely illustrative and not exhaustive and that the counter may be initialized to any value.

At block 704, a determination may be made as to whether the counter equals zero. In response to a negative determination, the method 700 may proceed to block 706. At block 706, in a first iteration of the method 700, composite image data 402 stored in the ordered data structure at an index corresponding to the counter value may be selected as source image data. The source image data selected during a first iteration of the method 700 may include the composite image data corresponding to the $L_n$ level of the pyramid 306.

At block 708, the source image data selected at block 706 may be up-sampled to generate up-sampled composite image data 404. In certain example embodiments, up-sampling may include increasing the amount of source image data by an integer or rational number factor to generate intermediate source image data, and may further include applying a low-pass filter to the intermediate source image data (e.g., convoluting the intermediate source image data with a Gaussian function) to generate the up-sampled composite image data 404. In certain example embodiments, up-sampling the source image may include interlacing zero intensity pixel values with the source image data.

At block 712, the up-sampled composite image data 404 may be summed or otherwise combined with the composite image data 406 corresponding to a next level of the pyramid 306 (e.g., the $L_{n-1}$ level). In an example embodiment of the disclosure, the composite image data 406 may be identified by decrementing the counter at block 710 and selecting composite image data stored in the ordered data structure at an index corresponding to the decremented counter value.

At block 714, the summed image data 408 may be stored, and the method 700 may again proceed to block 704, where a determination may be made as to whether the counter equals zero. As long as the counter is non-zero, the operations at blocks 706-714 may be performed iteratively. During each subsequent iteration of the method 700 after the initial iteration, the source image data selected at block 706 may be the summed image data generated during a previous iteration of the method 700.

During a final iteration of the method 700, a source image 410 (which may correspond to a summed image generated during a previous iteration of the method 700) may be up-sampled at block 708 to generate a final up-sampled image 412. The final up-sampled image 412 may not be summed with other composite image data because no additional levels of the pyramid 306 may remain for processing. However, the final up-sampled image 412 may be summed or otherwise combined with initial low-pass filtered image data 414 to generate final output image data 416. The initial low-pass filtered image data may correspond to the low-pass filtered image data generated at block 506 during a first iteration of the example method 500 in connection with generation of any of the constituent Laplacian pyramids used to generate the composite image data.

Figure 7:
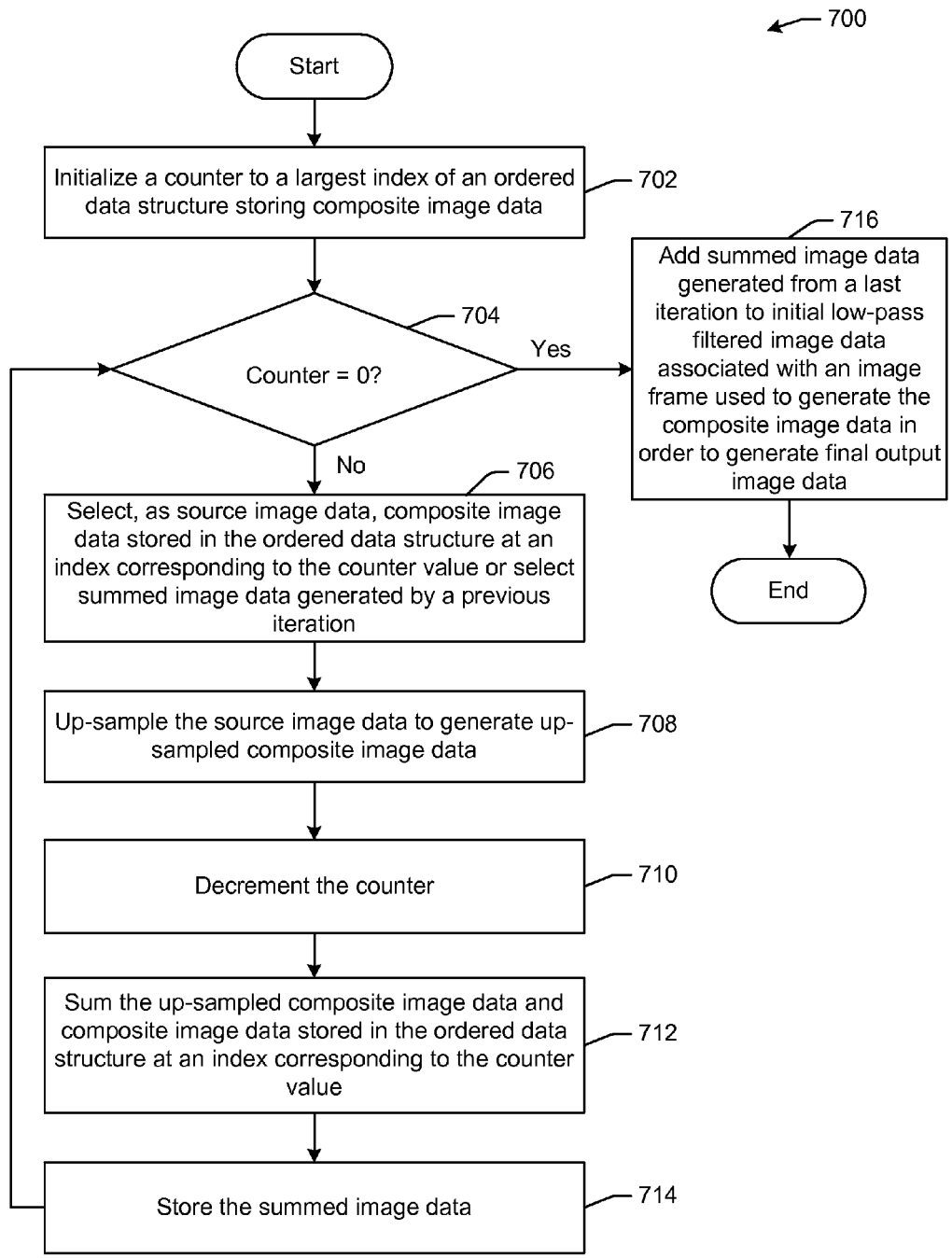
FIG. 7 is a process flow diagram of an illustrative method for up-sampling composite image data contained in a Laplacian pyramid to generate final output image data in accordance with one or more example embodiments of the disclosure.
Figure 8:
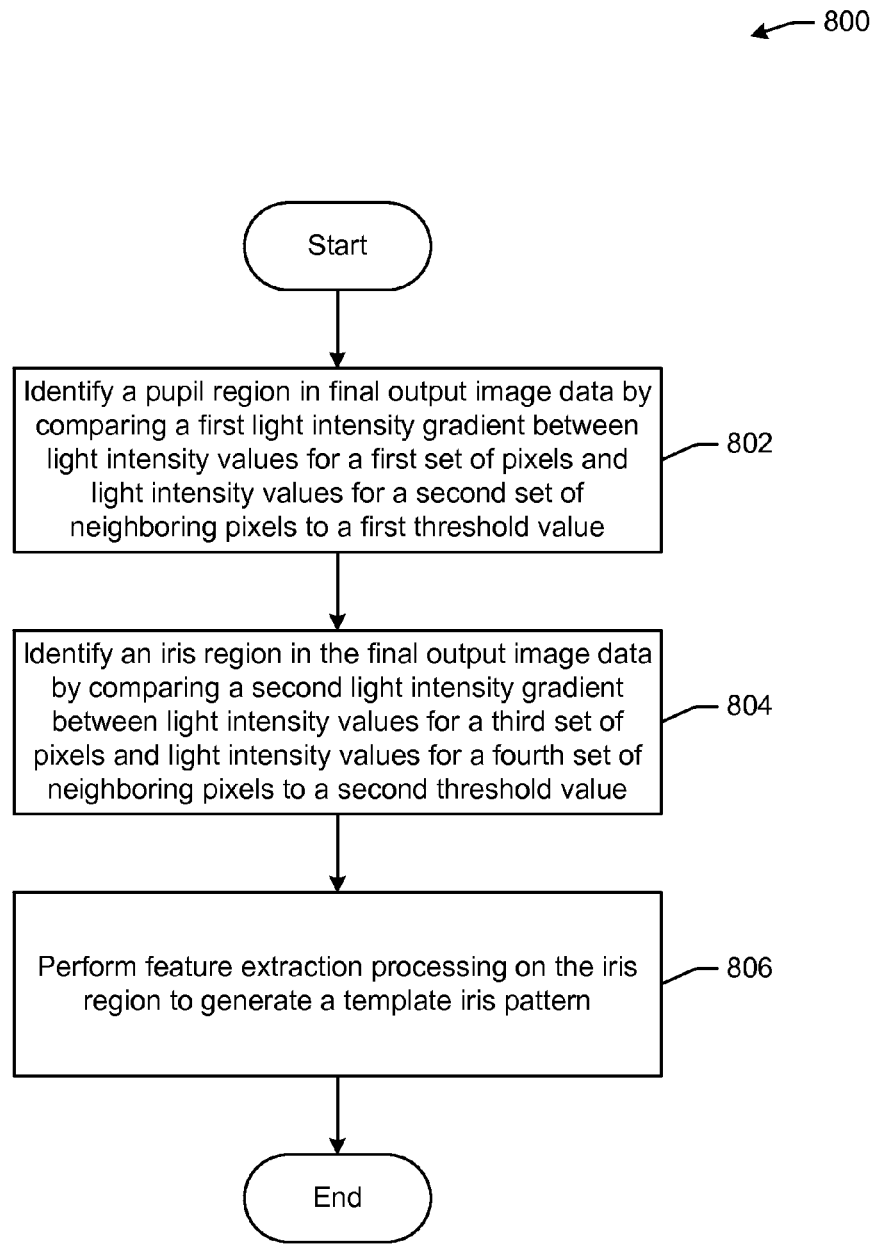
FIG. 8 is a process flow diagram of an illustrative method for generating a template iris pattern using the final output image data generated by the illustrative method of FIG. 7 in accordance with one or more example embodiments of the disclosure.

FIG. 8 is a process flow diagram of an illustrative method 800 for generating a template iris pattern from the final output image data generated by the illustrative method of FIG. 7 in accordance with one or more example embodiments of the disclosure. One or more operations of the method 800 may be performed responsive to execution, by one or more processors, of one or more iris template pattern generation modules 930.

At block 802, a pupil region in the final output image data may be identified. The pupil region may be identified by a comparing a first light intensity gradient between light intensity values for a first set of pixels and light intensity values for a second set of neighboring pixels to a first threshold value. If the first light intensity gradient exceeds the first threshold value, it may be determined that the first set of pixels corresponds, at least in part, to a boundary of the pupil region. Certain assumptions may be made to assist in selecting various first and second sets of pixels. For example, it may be assumed that the pupil region is roughly circular, and upon selection of a first set of pixels, the second set of neighboring pixels may be selected by moving radially outward from the first set of pixels.

At block 804, the iris region in the final output image data may be identified by comparing a second light intensity gradient between light intensity values for a third set of pixels and light intensity values for a fourth set of neighboring pixels to a second threshold value. If the second light intensity gradient exceeds the second threshold value, it may be determined that the third set of pixels corresponds, at least in part, to an outer boundary of the iris region. The inner boundary of the iris region may correspond to the boundary of the pupil region as determined at block 802.

Finally, at block 806, feature extraction processing may be performed on the iris region identified at block 804 to generate a template iris pattern for the individual. The template iris pattern may be stored and used for subsequent biometric identification/authentication.

Illustrative Device Architecture

Figure 9:
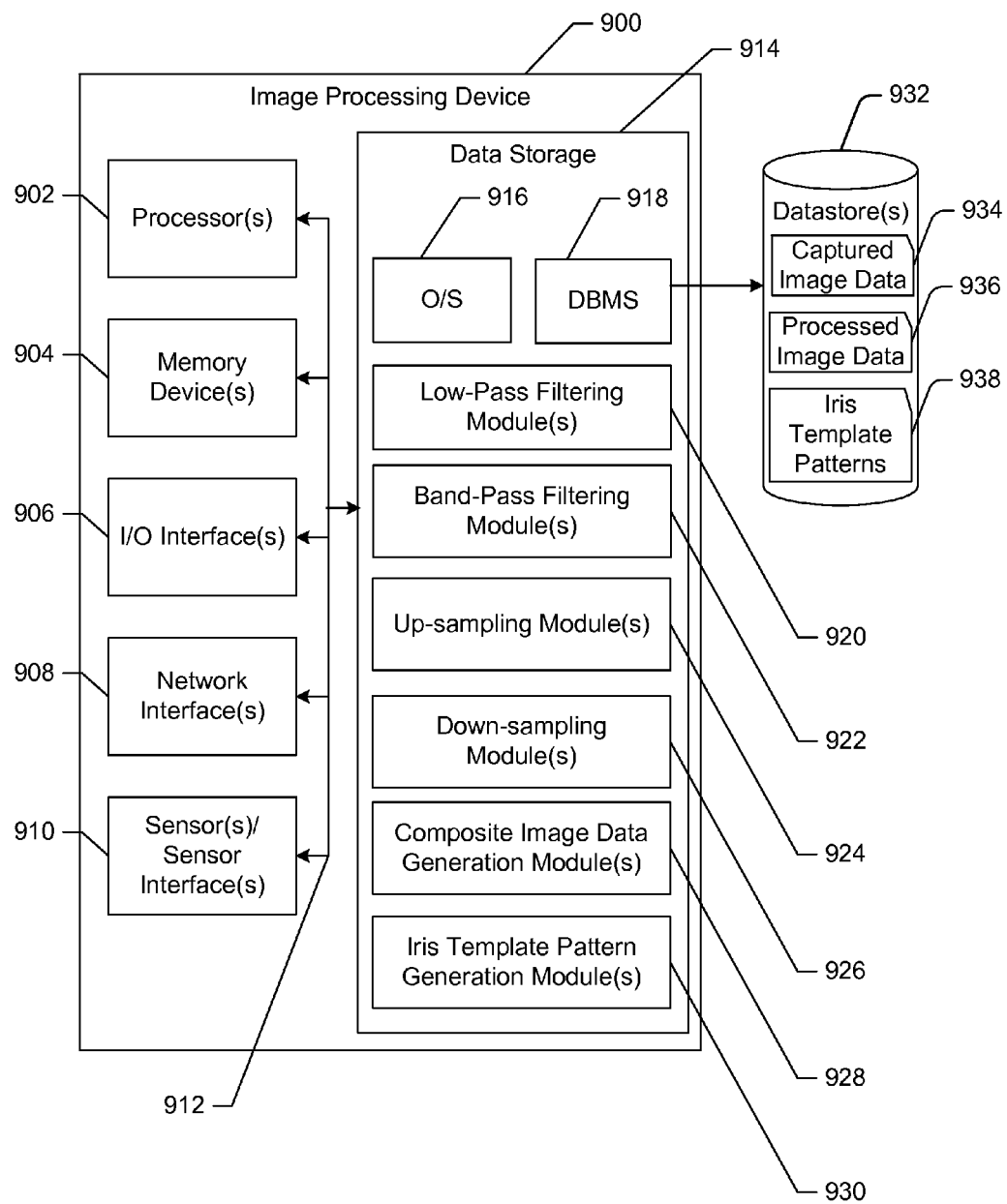
FIG. 9 is a schematic block diagram of an illustrative image processing device in accordance with one or more example embodiments of the disclosure.

FIG. 9 is a schematic block diagram of an illustrative image processing device 900 that may be used to perform any of the image processing described herein for generating a template iris pattern in accordance with one or more example embodiments of the disclosure. In an illustrative configuration, the device 900 may include one or more processors (processor(s)) 902, one or more memory devices 904 (generically referred to herein as memory 904), one or more input/output ("I/O") interface(s) 906, one or more network interfaces 908, one or more sensors or sensor interfaces 910, and data storage 914. The device 900 may further include one or more buses 912 that functionally couple various components of the device 900. In certain example embodiments, the device 900 may be a mobile device that may include one or more antennas (not shown) including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 912 may include at least one of a system bus, a memory bus, an address bus, or a message bus, and may permit exchange of information (e.g., data (including computer-executable code), signaling, etc.) between various components of the device 900. The bus(es) 912 may include, without limitation, a memory bus or a memory controller, a peripheral bus, an accelerated graphics port, and so forth. The bus(es) 912 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCM-CIA) architecture, a Universal Serial Bus (USB) architecture, and so forth.

The memory 904 of the device 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 914 may include removable storage and/or non-removable storage including, but not limited to, magnetic storage, optical disk storage, solid-state storage, and/or tape storage. The data storage 914 may provide non-volatile storage of computer-executable instructions and other data. The memory 904 and the data storage 914, removable and/or non-removable, are examples of computer-readable storage media (CRSM) as that term is used herein.

The data storage 914 may store computer-executable code, instructions, or the like that may be loadable into the memory 904 and executable by the processor(s) 902 to cause the processor(s) 902 to perform or initiate various operations. The data storage 914 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 914 for non-volatile storage.

More specifically, the data storage 914 may store one or more operating systems (O/S) 916; one or more database management systems (DBMS) 918; and one or more program modules, applications, or the like such as, for example, one or more low-pass filtering modules 920, one or more band-pass filtering modules 922, one or more up-sampling modules 924, one or more down-sampling modules 926, one or more composite image data generation modules 928, and one or more iris template pattern generation modules 930. The data storage 914 may further store any of a variety of other types of modules. Further, any program modules stored in the data storage 914 may include one or more sub-modules. Further, any data stored in the data storage 914 may be loaded into the memory 904 for use by the processor(s) 902 in executing computer-executable code. In addition, any data potentially stored in one or more datastores 932 (e.g., captured image data 934, processed image data 936, or iris template patterns 938) may be accessed via the DBMS 918 and loaded in the memory 904 for use by the processor(s) 902 in executing computer-executable code.

The processor(s) 902 may be configured to access the memory 904 and execute computer-executable instructions loaded therein. For example, the processor(s) 902 may be configured to execute computer-executable instructions of the various program modules of the device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program modules depicted in FIG. 9, the low-pass filtering module(s) 920 may include computer-executable instructions, code, or the like that responsive to execution by one or more of the processor(s) 902 may cause a low-pass filter to be applied to image data as part of, for example, the method 500 for generating a Laplacian pyramid for an image. As previously described, the low-pass filter may include, for example, a Gaussian filter.

The band-pass filtering module(s) 922 may include computer-executable instructions, code, or the like that responsive to execution by one or more of the processor(s) 902 may cause a band-pass filter to be applied to source image data using filtered data obtained from a low-pass filtering operation in order to obtain band-pass filtered data. In certain example embodiments, application of a band-pass filter may include generating a difference image by subtracting low-pass filtered data from source image data.

The up-sampling module(s) 924 may include computer-executable instructions, code, or the like that responsive to execution by one or more of the processor(s) 902 may cause image data to be up-sampled to increase the pixel density of the image data. The up-sampling module(s) 924 may be executed, for example, as part of the method 700 for generating final output image data.

The down-sampling module(s) 926 may include computer-executable instructions, code, or the like that responsive to execution by one or more of the processor(s) 902 may cause image data to be down-sampled to decrease the pixel density of the image data. The down-sampling module(s) 924 may be executed, for example, as part of the method 500 for generating a Laplacian pyramid for an image frame.

The composite image data generation module(s) 928 may include computer-executable instructions, code, or the like that responsive to execution by one or more of the processor(s) 902 may cause any of the operations of method 600 to be performed.

The iris template pattern generation module(s) 930 may include computer-executable instructions, code, or the like that responsive to execution by one or more of the processor(s) 902 may cause any of the operations of method 800 to be performed.

Referring now to other illustrative components depicted as being stored in the data storage 914, the O/S 916 may be loaded from the data storage 914 into the memory 904 and may provide an interface between other application software executing on the device 900 and hardware resources of the device 900. More specifically, the O/S 916 may include a set of computer-executable instructions for managing hardware resources of the device 900 and for providing common services to other application programs (e.g., managing memory allocation among various application programs). The O/S 916 may include any operating system now known or which may be developed in the future including, but not limited to, any server operating system, any mainframe operating system, or any other proprietary or non-proprietary operating system.

The DBMS 918 may be loaded into the memory 904 and may support functionality for accessing, retrieving, storing, and/or manipulating data stored in the memory 904, data stored in the data storage 914, and/or data stored in the one or more datastores 932. The DBMS 918 may use any of a variety of database models (e.g., relational model, object model, etc.) and may support any of a variety of query languages. The DBMS 918 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 900 is a mobile device, the DBMS 918 may be any suitable light-weight DBMS optimized for performance on a mobile device. Referring to the example types of data depicted as being stored in the datastore(s) 932, the captured image data 934 may include any number of IR/NIR and/or VW image frames. The processed image data 936 may include any data generated as a result of any of the image processing described herein (e.g., filtered data corresponding to a Laplacian pyramid, composite image data, final output image data, etc.). The iris template patterns 938 may include template patterns generated from final output image data. It should be appreciated that "data," as that term is used herein, includes computer-executable instructions, code, or the like.

Referring now to other illustrative components of the device 900, the one or more input/output (I/O) interfaces 906 may facilitate the receipt of input information by the device 900 from one or more I/O devices as well as the output of information from the device 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 900 may further include one or more network interfaces 908 via which the device 900 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The sensor(s)/sensor interface(s) 910 may include or may be capable of interfacing with any suitable type of sensing device such as, for example, ambient light sensors, inertial sensors, force sensors, thermal sensors, image sensors, magnetometers, and so forth. Example types of inertial sensors may include accelerometers (e.g., MEMS-based accelerometers), gyroscopes, and so forth.

The device 900 may be provided with antenna(s) (not shown), which may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

It should be appreciated that the program modules, applications, computer-executable instructions, code, or the like depicted in FIG. 9 as being stored in the data storage 914 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 900, and/or hosted on other computing device(s) accessible via one or more networks, may be provided to support functionality provided by the program modules, applications, or computer-executable code depicted in FIG. 9 and/or additional or alternate functionality. Further, functionality may be modularized differently such that processing described as being supported collectively by the collection of program modules depicted in FIG. 9 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 9 may be implemented, at least partially, in hardware and/or firmware across any number of devices.

It should further be appreciated that the device 900 may include alternate and/or additional hardware, software, or firmware components beyond those described or depicted without departing from the scope of the disclosure. More particularly, it should be appreciated that software, firmware, or hardware components depicted as forming part of the device 900 are merely illustrative and that some components may not be present or additional components may be provided in various embodiments. While various illustrative program modules have been depicted and described as software modules stored in data storage 914, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 500-800 may have been described above as being performed by one or more components of the device 900, or more specifically, by one or more one or more program modules executing on such a device 900. It should be appreciated, however, that any of the operations of methods 500-800 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the methods 500-800 may be described in the context of the illustrative device 900, it should be appreciated that such operations may be implemented in connection with numerous other system configurations.

The operations described and depicted in the illustrative methods of FIG. 5-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 5-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   receiving, at a computer processor, first image data and second image data, wherein the first image data corresponds to an infrared or near-infrared light image and the second image data corresponds to a visible light image;
   generating, by the computer processor, a first Laplacian pyramid using the first image data, wherein generating the first Laplacian pyramid comprises generating third image data comprising a first light intensity value for a first pixel and generating fourth image data comprising a second light intensity value for a second pixel;
   generating, by the computer processor, a second Laplacian pyramid using the second image data, wherein generating the second Laplacian pyramid comprises generating fifth image data comprising a third light intensity value for a third pixel corresponding to the first pixel and generating sixth image data comprising a fourth light intensity value for a fourth pixel corresponding to the second pixel, wherein the third image data and the fifth image data are respectively associated with first corresponding levels of the first Laplacian pyramid and the second Laplacian pyramid and the fourth image data and the sixth image data are respectively associated with second corresponding levels of the first Laplacian pyramid and the second Laplacian pyramid;
   generating, by the computer processor, a composite Laplacian pyramid, wherein generating the composite Laplacian pyramid comprises:
     generating first composite image data using the third image data and the fifth image data at least in part by selecting a higher value of the first light intensity value or the third light intensity value to obtain a first selected value and associating the first selected value with a fifth pixel corresponding to the first pixel and the third pixel, and
     generating second composite image data using the fourth image data and the sixth image data at least in part by selecting a higher value of the second light intensity value or the fourth light intensity value to obtain a second selected value and associating the second selected value with a sixth pixel corresponding to the second pixel and the fourth pixel;
   generating, by the computer processor, output image data using the first composite image data and the second composite image data at least in part by up-sampling the first composite image data to obtain up-sampled image data and combining the up-sampled image data with the second composite image data;
   identifying, by the computer processor, an iris region in the output image; and
   performing, by the computer processor, feature extraction processing on the iris region to generate a template iris pattern for use in biometric authentication.

2. The method of claim 1, wherein generating the first Laplacian pyramid further comprises:

applying, by the computer processor, a Gaussian filter to the first image data to obtain first low-pass filtered image data;

band-pass filtering, by the computer processor, the first image data by subtracting the first low-pass filtered image data from the first image data to obtain the third image data;

down-sampling, by the computer processor, the first low-pass filtered image data to obtain source image data having a smaller number of pixels than the first image data;

applying, by the computer processor, the Gaussian filter to the source image data to obtain second low-pass filtered image data; and band-pass filtering, by the computer processor, the source image data by subtracting the second low-pass filtered image data from the source image data to obtain the fourth image data.

3. The method of claim 1, wherein generating the third image data comprises low-pass filtering the first image data to obtain first low-pass filtered image data and generating the fifth image data comprises low-pass filtering the second image data to obtain second low-pass filtered image data.

4. The method of claim 3, wherein generating the output image data further comprises:
combining, by the computer processor, the first low-pass filtered image data or the second low-pass filtered image data with the combination of the up-sampled image data and the second composite image data to obtain the output image data.

5. A method, comprising:
receiving, at a computer processor, first image data and second image data, wherein the first image data corresponds to an infrared or near-infrared light image and the second image data corresponds to a visible light image;

filtering, by the computer processor, the first image to obtain third image data comprising high frequency components of the first image data, wherein the third image data comprises a first light intensity value for a first pixel;

filtering, by the computer processor, the second image data to obtain a fourth image data comprising high frequency components of the second image data, wherein the fourth image data comprises a second light intensity value for a second pixel corresponding to the first pixel;

generating, by the computer processor, composite image data using the third image data and the fourth image data at least in part by selecting a higher value of the first light intensity value or the second light intensity value and associating the higher value with a third pixel corresponding to the first pixel and the second pixel; and generating, by the computer processor, output image data using the composite image data.

6. The method of claim 5, wherein filtering the first image data to generate the third image data comprises:
applying, by the computer processor, a low-pass filter to the first image data to obtain first low-pass filtered image data; and applying, by the computer processor, a band-pass filter to the first image data using the first low-pass filtered image data to obtain the third image data, and wherein filtering the second image data to obtain the fourth image data comprises:
applying, by the computer processor, the low-pass filter to the second image data to obtain second low-pass filtered image data; and applying, by the computer processor, the band-pass filter to the second image data using the second low-pass filtered image data to obtain the fourth image data.

7. The method of claim 6, further comprising:
down-sampling, by the computer processor, the first low-pass filtered image data to obtain source image data;

applying, by the computer processor, the low-pass filter to the source image data to obtain third low-pass filtered image data; and applying, by the computer processor, the band-pass filter to the source image data using the third low-pass filtered image data to obtain fifth image data, wherein the third image data and the fifth image data correspond to first and second levels, respectively, of a first Laplacian pyramid associated with the first image data.

8. The method of claim 7, wherein the source image data is first source image data, the method further comprising:
down-sampling, by the computer processor, the second low-pass filtered image data to obtain second source image data;

applying, by the computer processor, the low-pass filter to the second source image data to obtain fourth low-pass filtered image data; and applying, by the computer processor, the band-pass filter to the second source image data using the fourth low-pass filtered image data to obtain sixth image data, wherein the fourth image data and the sixth image data correspond to first and second levels, respectively, of a second Laplacian pyramid associated with the second image data.

9. The method of claim 8, wherein the third image data and the fifth image data are stored at a first location and a second location, respectively, in a first ordered data structure corresponding to the first Laplacian pyramid and the fourth image data and the sixth image data are stored at a first location and a second location, respectively, in a second ordered data structure corresponding to the second Laplacian pyramid, and wherein the first location of the first ordered data structure corresponds to the first location of the second ordered data structure and the second location of the first ordered data structure corresponds to the second location of the second ordered data structure.

10. The method of claim 8, wherein down-sampling the first low-pass filtered image data comprises reducing a number of pixels in the first low-pass filtered image data by an integer factor to obtain the first source image data, and wherein down-sampling the second low-pass filtered image data comprises reducing a number of pixels in the second low-pass filtered image data by the integer factor to obtain the second source image data.

11. The method of claim 8, wherein the composite image data comprises first composite image data and the higher value is a first selected value, the method further comprising:
generating, by the computer processor, second composite image data at least in part by selecting a higher value of a third light intensity value in the fifth image data for a fourth pixel or a fourth light intensity value in the sixth image data for a fifth pixel to obtain a second selected value and associating the second selected value with a sixth pixel corresponding to the fourth pixel and the fifth pixel.

12. The method of claim 11, wherein generating the output image data comprises:
up-sampling, by the computer processor, the second composite image data to obtain up-sampled composite image data;

combining, by the computer processor, the up-sampled composite image data with the first composite image data to obtain combined image data; and combining, by the computer processor, the combined image data with the first low-pass filtered image data or the second low-pass filtered image data.

13. The method of claim 12, wherein up-sampling the second composite image data comprises increasing a number of pixels in the second composite image data to obtain the up-sampled composite image data having a same number of pixels as the first composite image data.

14. The method of claim 5, further comprising:

identifying, by the computer processor, an iris region in the output image data; and performing, by the computer processor, feature extraction processing on the iris region to generate a template iris pattern for an iris corresponding to the iris region.

15. The method of claim 14, wherein identifying an iris region in the output image data comprises:

determining, by the computer processor, a boundary of a pupil region in the output image data by determining that a first light intensity gradient between a first set of light intensity values in the output image data corresponding to a first set of pixels and a second set of light intensity values in the output image data corresponding to a second set of neighboring pixels exceeds a first threshold value, wherein the boundary of the pupil region is an inner boundary of the iris region; and determining, by the computer processor, an outer boundary of the iris region by determining that a second light intensity gradient between a third set of light intensity values in the output image data corresponding to a third set of pixels and a fourth set of light intensity values in the output image data corresponding to a fourth set of neighboring pixels exceeds a second threshold value, wherein the second threshold value is greater than the first threshold value.

16. A system, comprising:

at least one image sensor that detects infrared or near-infrared light and generates first image data corresponding to the infrared or near-infrared light and that detects visible light and generates second image data corresponding to the visible light;

at least one memory storing computer-executable instructions; and at least one processor configured to access the at least one memory and execute the computer-executable instructions to:

filter the first image data to obtain third image data comprising high frequency components of the first image data, wherein the third image data comprises a first light intensity value for a first pixel;

filter the second image data to obtain fourth image data comprising high frequency components of the second image data, wherein the fourth image data comprises a second light intensity value for a second pixel;

generate composite image data using the third image data and the fourth image data at least in part by selecting a higher value of the first light intensity value or the second light intensity value and associating the higher value with a third pixel corresponding to the first pixel and the second pixel; and generate output image data using the composite image data.

17. The system of claim 16, further comprising an infrared or near-infrared cut-off filter that blocks the infrared or near-infrared light from reaching the at least one image sensor and allows the at least one image sensor to detect the visible light and generate the second image data.

18. The system of claim 16, further comprising an infrared or near-infrared band-pass filter that allows the at least one image sensor to detect the infrared or near-infrared light.

19. The system of claim 16, wherein the at least one processor is further configured to:

identify an iris region in the output image data; and perform feature extraction processing on the iris region to generate a template iris pattern for an iris corresponding to the iris region.

20. The system of claim 17, wherein the third image data is associated with a first level of a first Laplacian pyramid, and wherein the fourth image data and the composite image data are associated with corresponding levels of a second Laplacian pyramid and a third Laplacian pyramid, respectively.

* * * * *